(12) United States Patent
Hashimoto et al.

(10) Patent No.: US 6,377,679 B1
(45) Date of Patent: Apr. 23, 2002

(54) SPEAKERPHONE

(75) Inventors: Hiroshi Hashimoto; Yoshiro Nishimoto; Tetsuya Takahashi, all of Kobe; Akira Nakazumi, Osaka; Masahiro Nishisaka, Osaka; Toru Takahashi, Osaka; Masahiko Toyoshima, Osaka, all of (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 08/993,412

(22) Filed: Dec. 18, 1997

(30) Foreign Application Priority Data

Dec. 26, 1996 (JP) .............................................. 8-348228
Dec. 26, 1996 (JP) .............................................. 8-348229

(51) Int. Cl.[7] .............................................. H04M 11/00
(52) U.S. Cl. ............................. 379/388.05; 379/390.01; 379/388.01
(58) Field of Search ....................... 379/388.05, 388.06, 379/388.07, 390.01, 390.02, 388.04, 388.01

(56) References Cited

U.S. PATENT DOCUMENTS 4,901,346 A * 2/1990 Erving ................... 379/388.06
4,959,857 A * 9/1990 Erving et al. ................ 379/390
5,099,472 A * 3/1992 Townsend et al. ...... 379/388.05
5,838,787 A * 11/1998 Ding et al. .................. 379/390

* cited by examiner

Primary Examiner—Stella Woo
(74) Attorney, Agent, or Firm—Reed Smith LLP

(57) ABSTRACT

The conventional speakerphone using the voice switch, when combined with the echo canceler, involves a problem that the threshold for switching the transmit/receive state of the voice switch cannot comply smoothly and stably with the performance variation of the echo canceler, thereby obstructing echo canceling in a manner that the voice switch cooperates with the echo canceler.

The speakerphone of the invention estimates the performance variation of the adaptive filter by using the integrated value of a power of the receive signal or the transmit signal referred in the past when the adaptive filter learns, and varies the threshold in accordance with the performance variation. Thus, the speakerphone of the invention achieves a stable communication system that approaches to the fill duplex with the voice switching system and the echo canceling system combined.

12 Claims, 11 Drawing Sheets

FIG. 1A
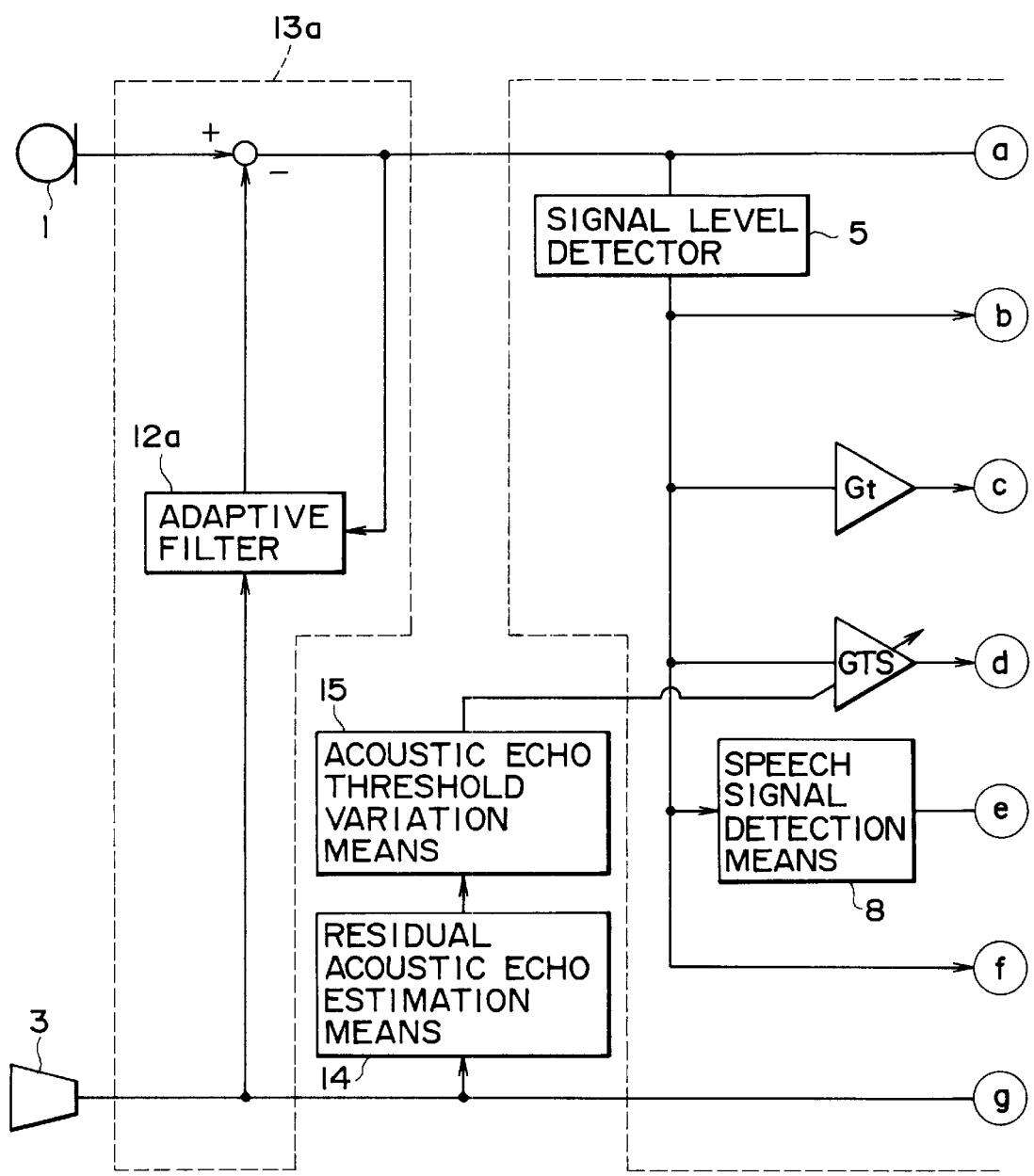
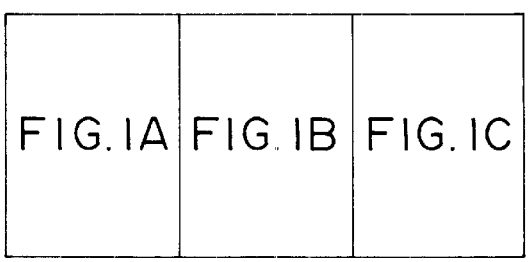
FIG. 1

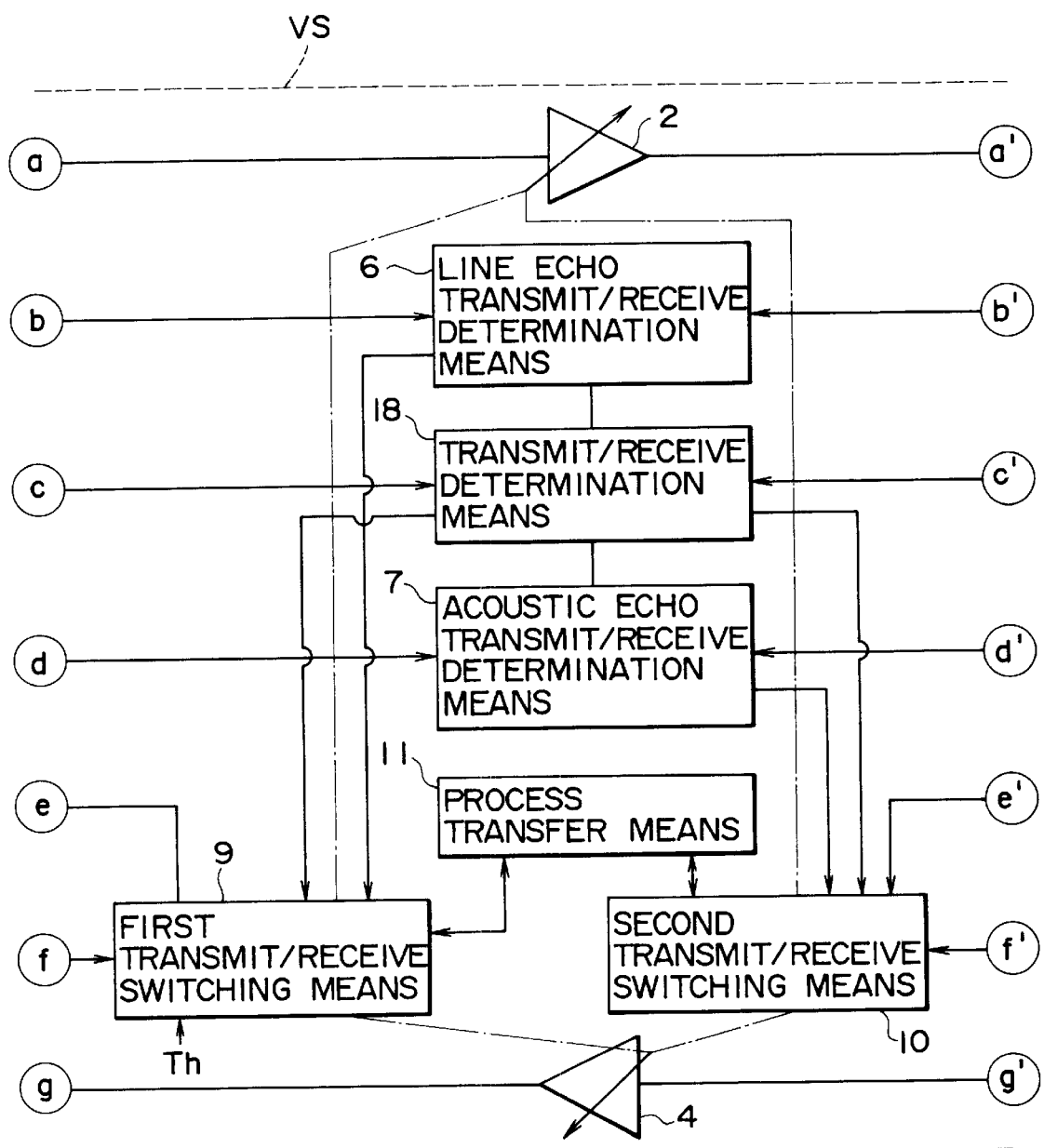

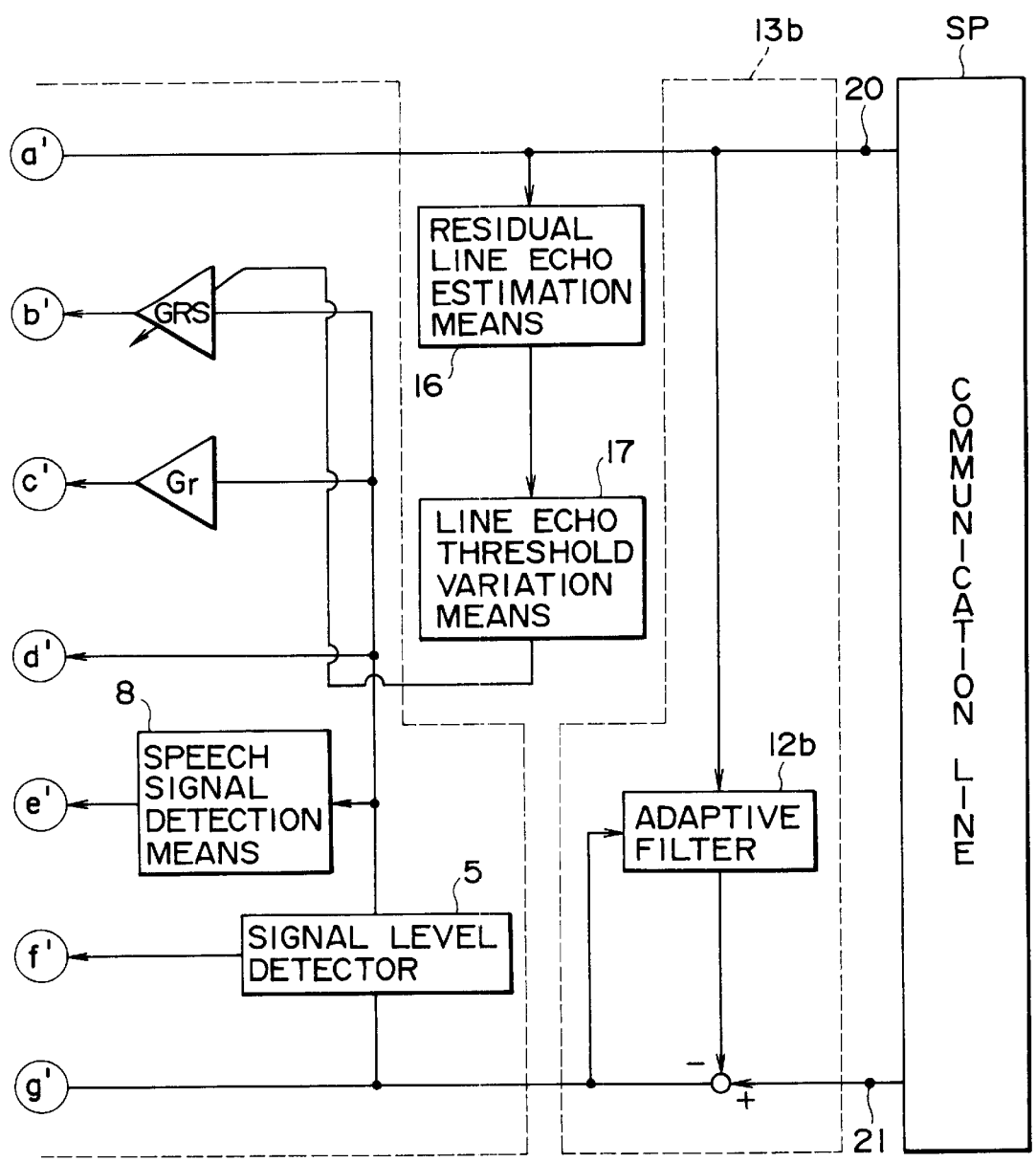

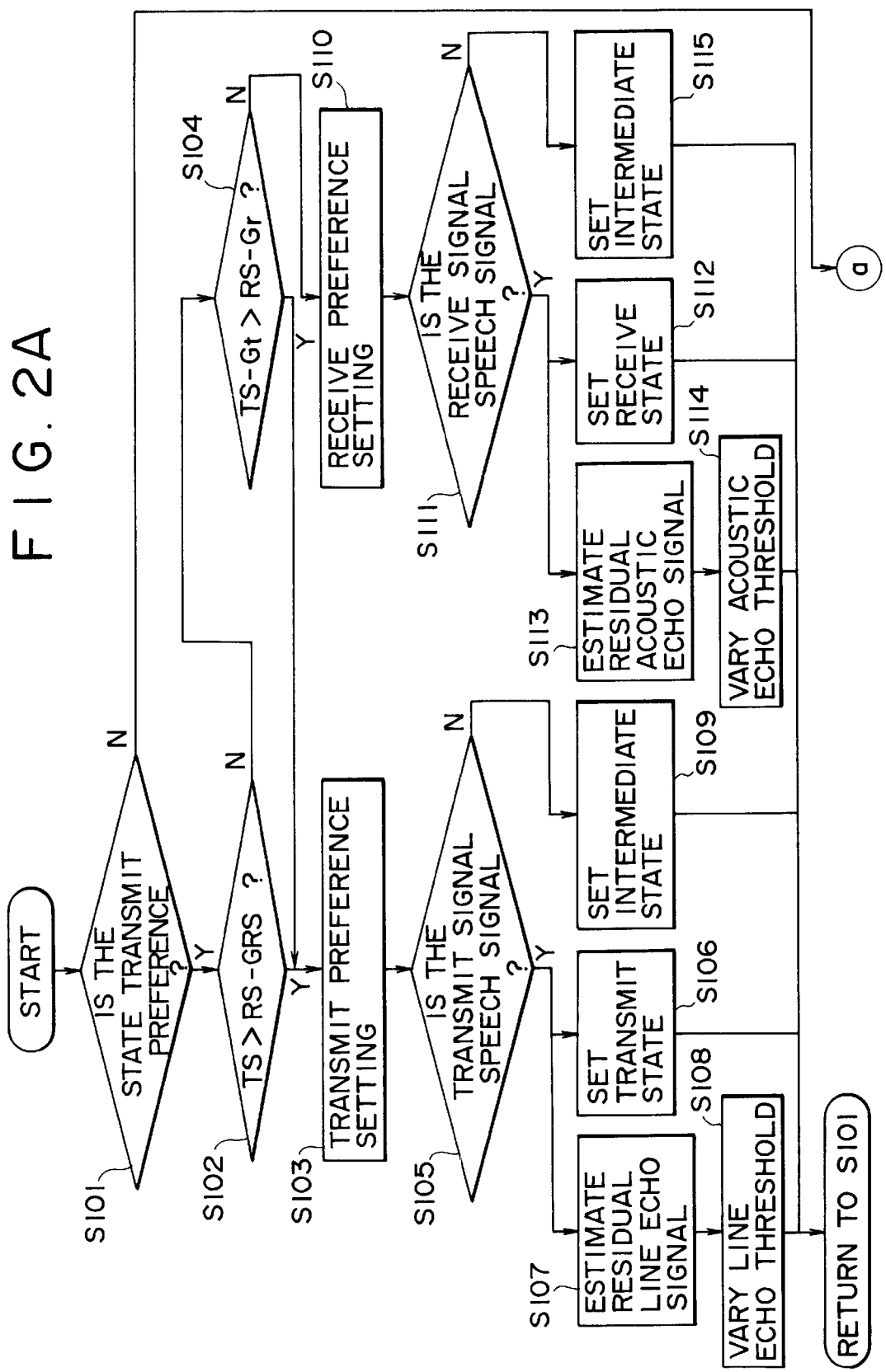

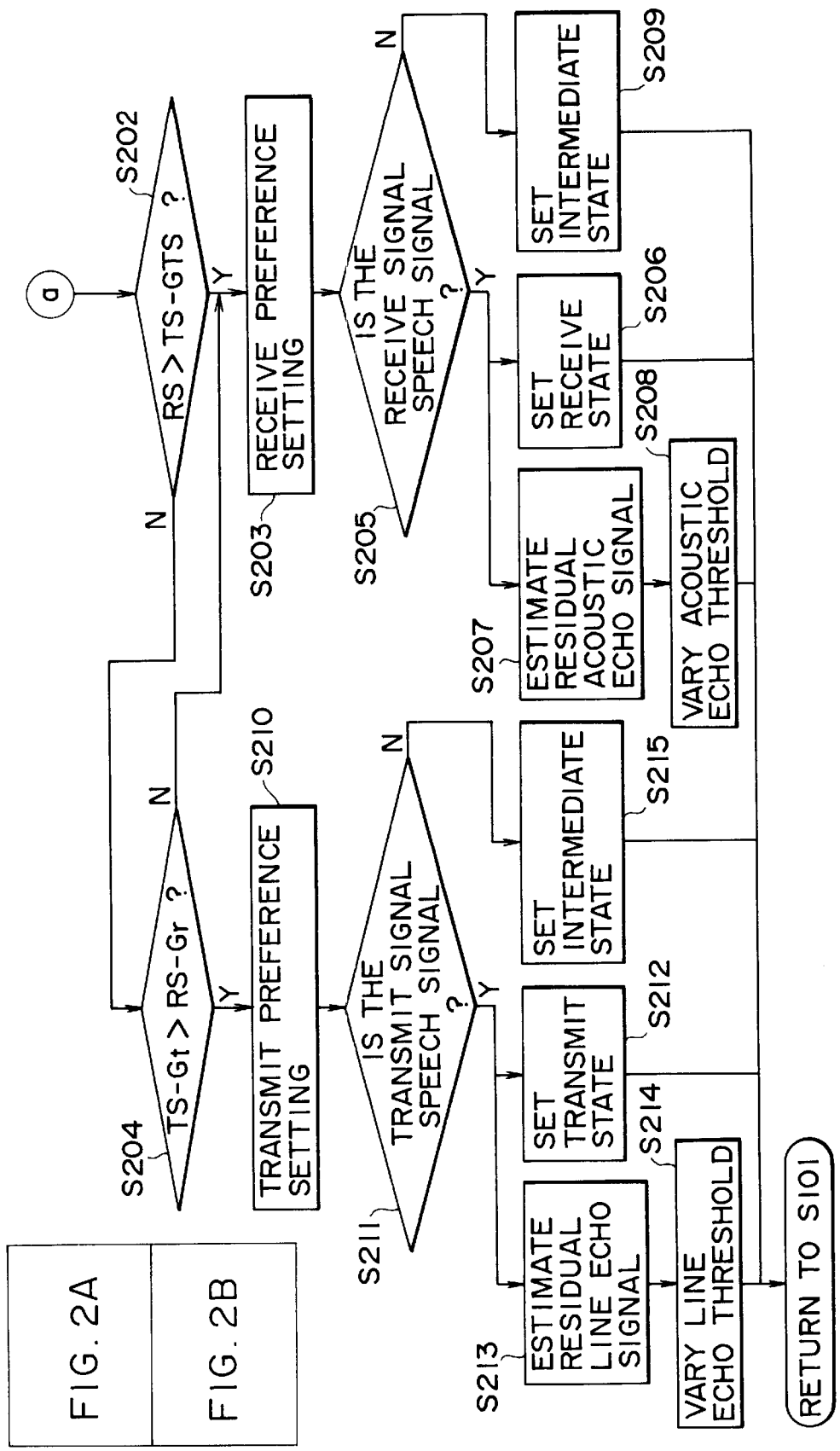

F I G. 4A
F I G. 4B
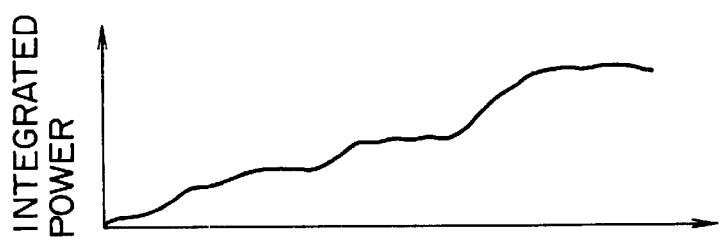
F I G. 4C
F I G. 4D
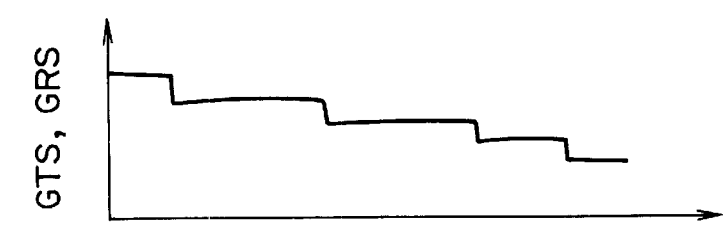

F I G. 5A
F I G. 5B
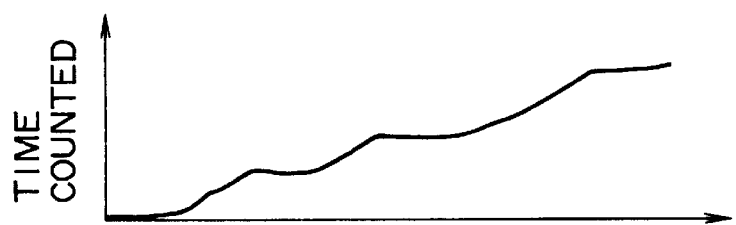
F I G. 5C
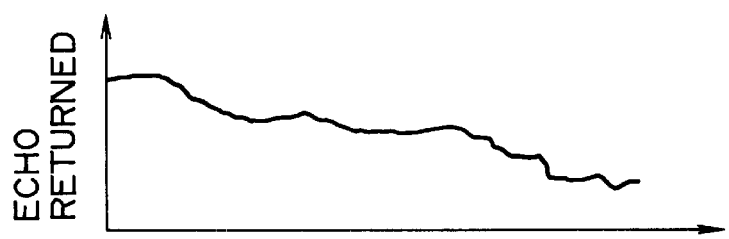
F I G. 5D
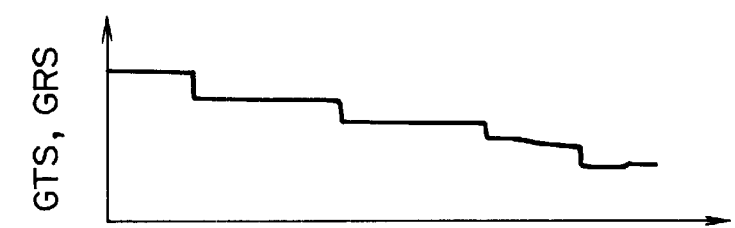

SPEAKERPHONE

BACKGROUND OF THE INVENTION

1. Field of the Invention

The present invention relates to a speakerphone that estimates an echo canceling performance of an echo canceler through an easy processing and improves the transmit and receive switching performance of the voice switch, in a full-duplex communication system using a speaker and microphone.

2. Description of the Related Art

The speakerphone used for a telephone conversation using a speaker and microphone without using a handset has been applied widely to a teleconference system that connects plural locations, and to the automobile telephone system wherein the driver cannot free his hands from the steering for obvious safety reasons.

However, this speakerphone involves troublesome phenomena, such as an acoustic echo generated by sounds emitted from the speaker returning to the microphone while reflecting, and a line echo generated by a talker's uttered voice being reflected at the connections on the communication line due to the impedance mismatching thereat. FIG. 6 is a chart for simply explaining the acoustic echo and the line echo.

What makes the problem acute is that the acoustic echo path and the line echo path coincide so as to make up a closed loop (formed of a microphone 61, communication line SP, and speaker 62), as shown in FIG. 6. If the gain of the foregoing closed loop exceeds 1, it will generate an oscillation (howling) inside the closed loop, which will in the worst case disable the conversation. Even if the howling does not occur, if there is a line echo, the talker's uttered voice will be emitted from the speaker 62 with a delay, and hence, the talker will be in a trouble of speaking.

Devices have been provided in order to avoid the influence of these echoes, which can be classified roughly into two. One of them is a half duplex voice switching system, wherein, when a near-end talker is speaking, an electric loss is inserted on the receive path of the talker (transmit state), when the talker is listening to, an electric loss is inserted on the transmit path of the talker (receive state). In this system, the switching of the transmit and the receive state is carried out on the basis of the voices uttered by the near-end talker or the far-end talker.

The other one is an echo canceling system, wherein an adaptive filter to estimate the characteristic of the foregoing echo is employed to produce a signal similar to the echo, and the signal is subtracted from the transmit and the receive paths to thereby remove the echo signal from the closed loop. In the echo canceling system, echoes are removed in real time, both the transmit and receive paths are not closed, and hence, the full duplex communication is possible.

The technique relating to the speakerphone using the foregoing voice switch is disclosed, for example, in the Japanese Patent Application Laid-open No. 5-44221. FIG. 7 is a functional block representation of the speakerphone disclosed in the foregoing document.

As shown in FIG. 7, a speakerphone 100 using the voice switch comprises a transmit section 200, a receive section 300, and a computer 110. The transmit section 200 includes a multiplexer 210 for temporarily storing a plurality of input signals such as speech signals inputted from a microphone 111, a mute control 211 to dose the transmit path in accordance with a control signal from the computer 110 described later, a high pass filter 212 for removing background noises contained in the foregoing speech signals, a programmable attenuator 213 (equivalent to receive state setting means) for giving attenuation to the foregoing speech signals passed through the high pass filter 212 in accordance with a control signal from the computer 110, an envelope detector 214 for detecting an envelope of a speech signal outputted from the high pass filter 212, a low pass filter 215 for reducing switching noises generated by the programmable attenuator 213 and shaping output waveforms to a communication line 101, and a logarithmic amplifier 216 for logarithmically amplifying an output from the envelope detector 214.

The receive section 300 contains functionally the same circuits as the transmit section 200: a multiplexer 310 for temporarily storing a plurality of input signals such as speech signals received through a communication line 102, a mute control 311 to dose the receive path in accordance with a control signal from the computer 110, a high pass filter 312 for removing background noises contained in the foregoing speech signals, a programmable attenuator 313 (equivalent to transmit state setting means) for giving attenuation to the foregoing speech signals passed through the high pass filter 312 in accordance with a control signal from the computer 110, an envelope detector 314 for detecting an envelope of a speech signal outputted from the high pass filter 312, a low pass filter 315 for reducing switching noises generated by the programmable attenuator 313 and shaping output waveforms to a speaker 112, and a logarithmic amplifier 216 for logarithmically amplifying an output from the envelope detector 314.

And, the foregoing computer 110 (equivalent to state switching means) receives signals from the logarithmic amplifiers 216, 316 through a multiplexer 117 and an A/D converter 115, and controls the mute controls 211, 311 and the programmable attenuators 213,313. Further, the computer 110 is connected to a calibration circuit 113 as well. The calibration circuit 113 feeds a specific calibration tone to the multiplexers 210 and 310 to assist the estimation of system characteristics.

The operation of the foregoing speakerphone, specially a transmit break-in operation switching from the receive state to the transmit state will hereunder be described. FIG. 8 is a flow chart for explaining the transmit break-in operation.

As shown in FIG. 8, when the process comes into step 1001, the speakerphone enters the receive state. Then, the process advances to step 1002 where a determination is made as to whether a transmit signal TX-S inputted from the microphone 111 exceeds an expected transmit signal IX-E by a specific threshold Th. Here, the expected transmit signal TX-E is a transmit signal expected to be generated by the coupling of the receive signal RX-S from the speaker 112 to the microphone 111. The reason to provide this step 1002 is to prevent a phenomenon that the device generates the self-switching by the receive signal RX-S emitted from the speaker 112 and the influence of an acoustic echo, while the near-end talker does not speak.

At step 1002, if the transmit signal TX-S exceeds the expected transmit signal TX-E, the process advances to step 1003 where a determination is made as to whether the transmit signal TX-S exceeds a transmit noise TX-N by a specific threshold Th. The decision at this step is provided to determine whether the transmit signal TX-S is a voice signal or a noise signal.

At step 1003, after the transmit signal TX-S is confirmed as a voice signal, the process advances to step 1004 where a comparison is made whether the transmit signal TX-S exceeds the receive signal RX-S by a specific threshold Th. And, if the transmit signal TX-S is greater than the receive signal RX-S at step 1004, the process moves to step 1005 where the holdover timer is initialized, and then the process moves to step 1006 where it brings the device into the transmit state.

Thus, the foregoing speakerphone prevents an error switching due to the acoustic echo by comparing the transmit signal TX-S with the expected transmit signal TX-E. To prevent the error switching due to the line echo is performed substantially in the same manner as in the acoustic echo, and the description will be omitted Incidentally, the threshold used in the foregoing expected transmit signal TX-E and the decision at step 1004 is determined by using a calibration tone actually outputted from the calibration circuit 113. More concretely, the calibration circuit 113 generates a audio frequency signal covering from 300 Hz to 3.4 kHz, and the speaker emits the audible sounds into the environment in a regular manner. On the basis of the acoustic response characteristics then measured, the maximum amplitude of the acoustic echo and the duration of reverberation, etc., are obtained. Thereby, the foregoing expected transmit signal TX-E and the threshold are determined. The calibration tone is transmitted while the speech signal is not detected on the transmit path and the receive path so as to vary the expected transmit signal TX-E and/or the threshold in correspondence with the change of the environment.

Accordingly, when the environment produces less reverberation and the acoustic condition is good, or when the line condition is good, it is possible to perform a communication that approaches to the fill duplex system by lowering the break-in threshold determined in accordance with the acoustic echo or the line echo.

On the other hand, the technique relating to the echo canceler is disclosed, for example, in the Japanese Patent Application Laid-open No. 61-258554. FIG. 9 illustrates a block diagram of the echo canceler disclosed in the foregoing document.

As shown in FIG. 9, the echo canceler includes: an XR memory 906 for storing in time series a receive signal XR received from the communication line, an A memory 907 for storing an estimated value A of the acoustic echo returning to the microphone 901 from a speaker 902 while reflecting, an arithmetic circuit 908 for operating the convolution of the receive signal XR and the estimated value A, a subtracter 909 for subtracting the output of the arithmetic circuit 908 from the acoustic echo signal to thereby suppress the acoustic echo signal, an XT memory 910 for storing in time series a transmit signal XT, an H memory 911 for storing an estimated value H of the line echo, an arithmetic circuit 912 for operating the convolution of the transmit signal XT and the estimated value H, a subtracter 913 for subtracting the output of the arithmetic circuit 912 from the line echo signal to thereby suppress the line echo signal, an adaptive control circuit 914 for acquiring an adjusting coefficient that sequentially adjusts the estimated value A stored in the A memory 907 on the basis of the receive signal XR stored in the XR memory 906 and the output of the subtracter 909, and the same for acquiring an adjusting coefficient that sequentially adjusts the estimated value H stored in the H memory 911 on the basis of the transmit signal XT stored in the XT memory 910 and the output of the subtracter 913, an adder 915 for sequentially adjusting the estimated value A by adding the adjusting coefficient acquired by the adaptive control circuit 914, an adder 916 for sequentially adjusting the estimated value H by adding the adjusting coefficient acquired by the adaptive control circuit 914, switches 917, 918, 919 for selecting the input/output signals of the adaptive control circuit 914, and a signal detector 920 (equivalent to speech signal detection means) for detecting the speech signal of the transmit signal and the receive signal and controlling the switches 917, 918, 919.

Although an echo canceler is usually provided with the adaptive control circuit for removing the acoustic echo and the adaptive control circuit for removing the line echo separately, the foregoing echo canceler, having a single adaptive control circuit 914, performs the processings usually done by the foregoing two adaptive control circuits with the assistance of the signal detector 920 and the switches 917, 918, 919 to control the input/output; and thereby achieves to simplify the hardware construction. Here, the process of removing the acoustic echo is basically the same as that of removing the line echo, and hence, the removal of the acoustic echo will mainly be referred to hereunder, and the removal of the line echo will be omitted as long as not needed.

In the foregoing echo canceler, when the signal detector 920 detects a speech signal only in the receive signal XR, the echo canceler starts the adaptive learning. In other words, the adjusting coefficient $\Delta a_n$ acquired by the adaptive control circuit 914 sequentially modifies the estimated value sequence $a_n$ of the impulse response, stored in the A memory 907. This adjustment employs, for example, the method of identification by learning. The following equation (1) expresses concretely the adjustment by the method of identification by learning.

$$a_n = a_{n-1} + \Delta a_{n-1} \qquad \text{[equation 1]}$$

$$= a_{n-1} + \frac{\alpha(YR_{n-1} - a_{n-1} \cdot XR'_{n-1})XR_{n-1}}{XR_{n-1} \cdot XR'_{n-1}}$$

$$= a_{n-1} + \frac{\alpha\left(YR_{n-1} - \sum_{k=0}^{N-1} a_{n-1,k} \cdot XR_{n-k-1}\right)XR_{n-1}}{\sum_{j=1}^{N} XR_{n-1}^2}$$

here, a: loop gain, N: degree of the adaptive filter, $YR_{n-1}$: acoustic echo signal at time n−1.

Further, the foregoing adaptive learning is performed when the speech signal is detected only in the receive signal, and the reason is as follows. Since the speech signal uttered by the near-end talker is originally independent on the acoustic echo characteristics, if the speech signal uttered by the near-end talker together with the acoustic echo signal is inputted to the echo canceler, the speech signal uttered by the near-end talker functions as disturbances so as to obstruct the learning of the echo canceler.

Thus, the speakerphone containing the foregoing echo canceler is able to remove the echo in a better accuracy along with the time progress, by sequentially adjusting the impulse response of the adaptive filter, using the method of identification by learning.

Incidentally, the combination of the foregoing voice switching system and the echo canceling system will attenuate the echo by the attenuator of the voice switch as well as remove the echo to some extent by the adaptive filter of the echo canceler. Therefore, the combination has a possibility to provide a system that approaches to the full duplex system and is more immune from influence by the echoes.

The problem here lies in the setting of the threshold for switching the transmit state and the receive state in the voice switching system. The voice switching system is able to directly measure the characteristics of the system by the calibration tone generated from the calibration circuit 113 and to adjust the threshold to the echo. However, if combined with the echo canceling system, the amount of the echo varies from moment to moment which remains in the system in correspondence with the degree of learning by the adaptive filter. Therefore, the threshold calibrated only within a specific period will cause most calibrations to result in wastes, and will cause error switching as well.

The present invention intends to solve the problems in these conventional techniques and to improve the speakerphone, and it is therefore an object of the invention to provide a speakerphone combining the voice switching system and the echo canceling system, which stably performs a communication that approaches to the full duplex while estimating a performance variation of the adaptive filter on the basis of the past signal referred to when the adaptive filter performs the learning.

SUMMARY OF THE INVENTION

In order to achieve the foregoing object, the speakerphone according to the first invention comprises: receive state setting means for setting a receive state to attenuate a transmit signal inputted from a microphone before transmitting the transmit signal into a communication line; transmit state setting means for setting a transmit state to attenuate a receive signal received from the communication line before outputting the receive signal from a speaker; state switching means for determining a state and setting the determined state, said state switching means comprising means for comparing the difference between the transmit signal and the receive signal with an acoustic echo threshold set to an acoustic echo generated by the receive signal returning to the microphone from the speaker; speech signal detection means for detecting a speech signal from the transmit signal and the receive signal; acoustic echo canceling means, including an adaptive filter for sequentially estimating the characteristics of the acoustic echo by varying the response on the basis of the acoustic echo when the speech signal detection means detects the speech signal only in the receive signal, for subtracting a quasi-acoustic echo signal obtained by inputting the receive signal to the adaptive filter from the transmit signal; residual acoustic echo estimation means for estimating a residual acoustic echo signal remaining without being removed by the acoustic echo canceling means on the basis of the history of the receive signal outputted in the past from the speaker; and acoustic echo threshold variation means for varying the acoustic echo threshold of the state switching means in accordance with the residual acoustic echo signal estimated by the residual acoustic echo estimation means.

The speakerphone relating to the foregoing first invention is able to estimate the residual acoustic echo signal on the basic of the receive signal emitted in the past from the speaker, and to vary the acoustic echo threshold for switching the transmit state and receive state in correspondence with the estimated residual acoustic echo signal. Therefore, putting the acoustic echo canceling means and the transmit/receive state setting means into cooperation, the speakerphone is able to achieve a full-duplex communication system, which improves in the transmit/receive switching performance and presents a better feeling of operation compared to the conventional speakerphone.

In the foregoing speakerphone, the residual acoustic echo signal can be estimated, for example, on the basis of the integrated value of power of the receive signal obtained by integrating the power of the receive signal when the foregoing speech signal detection means detects the speech signal only in the receive signal. And, the residual acoustic echo signal can be estimated on the basis of the integrated value of the receive signal detected obtained by integrating the detected time of the receive signal when the foregoing speech signal detection means detects the speech signal only in the receive signal. A simple process such as the integration of power of the receive signal or the integration of time of the receive signal detected will reduce the quantity of the arithmetic operation for varying the acoustic echo threshold, which provides a speakerphone system that is inexpensive and consumes a less power compared to the conventional.

Further, in the foregoing speakerphone, the state switching means maintains the receive state or the transmit state when the speech signal detection means detects the speech signal from the receive signal or the transmit signal, and shifts the attenuation in the receive state setting means and the transmit state setting means into an intermediate attenuation when the speech signal detection means does not detect a speech signal.

Accordingly, in such a circumstance that there is not a great level difference between the receive signal and the transmit signal, for example, while receiving a speech signal from a far-end talker, the talker lapses into silence for a while, the speakerphone with this arrangement is able to return to the receive state immediately when the far-end talker resumes speaking, and to avoid an initial sound from being cut out as is the case with the conventional speakerphone, since this arrangement will not change the processing procedure while maintaining the receive state and only shifting the attenuation in the receive state and transmit state setting means into an intermediate attenuation.

Further, the speakerphone according to the second invention comprises: receive state setting means for setting a receive state to attenuate a transmit signal inputted from a microphone before transmitting the transmit signal into a communication line; transmit state setting means for setting a transmit state to attenuate a receive signal received from the communication line before outputting the receive signal from a speaker; state switching means for determining a state and setting the determined state, said state switching means comprising means for comparing the difference between the transmit signal and the receive signal with a line echo threshold set to a line echo generated by the transmit signal returning to a line receive side from a line transmit side; speech signal detection means for detecting a speech signal from the transmit signal and the receive signal; line echo canceling means, including an adaptive filter for sequentially estimating the characteristics of the line echo by varying the response on the basis of the line echo when the speech signal detection means detects the speech signal only in the transmit signal, for subtracting a quasi-line echo signal obtained by inputting the transmit signal to the adaptive filter from the receive signal; residual line echo estimation means for estimating a residual line echo signal remaining without being removed by the line echo canceling means on the basis of the history of the transmit signal outputted in the past from the microphone to the line; and line echo threshold variation means for varying the line echo threshold of the state switching means in accordance with the residual line echo signal estimated by the residual line echo estimation means.

The speakerphone relating to the foregoing second invention is able to estimate the residual line echo signal on the basis of the transmit it signal outputted in the past from the microphone to the line, and to vary the line echo threshold for switching the transmit state and receive state in correspondence with the estimated residual line echo signal. Therefore, putting the line echo canceling means and the transmit/receive state setting means into cooperation, the speakerphone is able to achieve a full-duplex communication system, which improves in the transmit/receive switching performance and presents a better feeling of operation compared to the conventional speakerphone.

In the foregoing speakerphone, the residual line echo signal can be estimated, for example, on the basis of the integrated value of power of the transmit signal obtained by integrating the power of the transmit signal when the foregoing speech signal detection means detects the speech signal only in the transmit signal. And, the residual line echo signal can be estimated on the basis of the integrated value of the transmit signal detected obtained by integrating the detected time of the transmit signal when the foregoing speech signal detection means detects the speech signal only in the transmit signal. A simple process such as the integration of power of the transmit signal or the integration of a detected time of the transmit signal will reduce the quantity of the arithmetic operation for varying the line echo threshold, which provides a speakerphone system that is inexpensive and consumes a less power compared to the conventional.

Further, in the foregoing speakerphone, the state switching means maintains the transmit state or the receive state when the speech signal detection means detects the speech signal from the transmit signal or the receive signal, and shifts the attenuation in the receive state setting means and the transmit state setting means into an intermediate attenuation when the speech signal detection means does not detect a speech signal.

Accordingly, in such a circumstance that there is not a great level difference between the transmit signal and the receive signal, for example, a near-end talker lapses into silence for a while during communication, the speakerphone with this arrangement is able to return to the transmit state immediately when the near-end talker resumes speaking to detect the speech signal, and to avoid an initial sound from being cut out as is the case with the conventional speakerphone, since this arrangement will not change the processing procedure while maintaining the transmit state and only g the attenuation in the transmit state and receive state setting means into an intermediate attenuation.

Further, the speakerphone according to the third invention is a combination of the first and the second invention. The third invention is able to reduce the effect of both an acoustic echo and a line echo and realize the smoother switching of the state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings:

FIG. 1 is a block diagram of a speakerphone relating to one embodiment of the present invention;

FIG. 2 is a flow chart for explaining the operation of the foregoing speakerphone;

FIG. 4 is a graph for explaining the estimation of the characteristic variation by the integrated value of an input signal power;

FIG. 5 is a graph for explaining the estimation of the characteristic variation by the integrated value of time for detecting a speech signal;

DESCRIPTION OF THE PREFERRED EMBODIMENT

Figure 3:
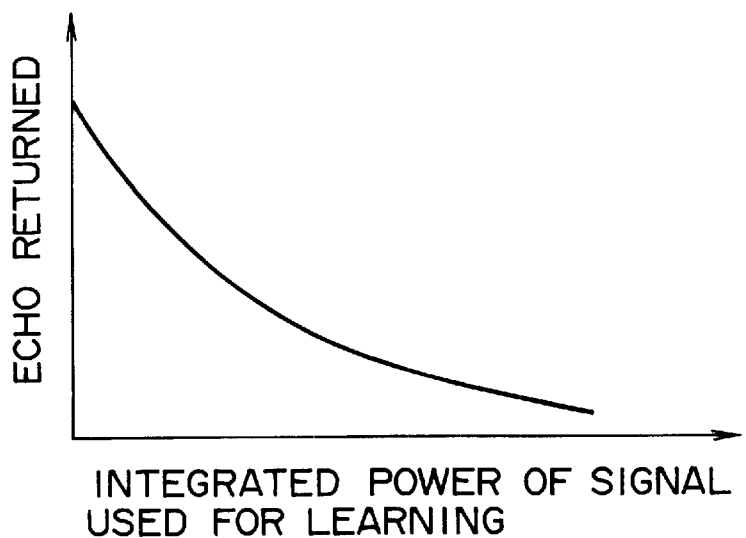
FIG. 3 is a graph showing the variation of the characteristics of an echo canceler in time series.
Figure 6:
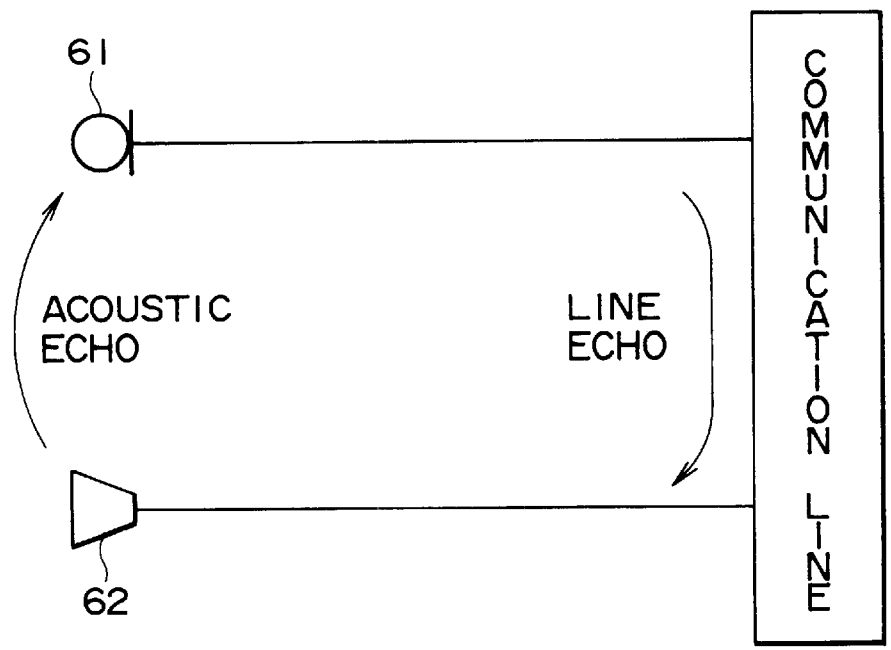
FIG. 6 is a chart for simply explaining the echo phenomenon.
Figure 7:
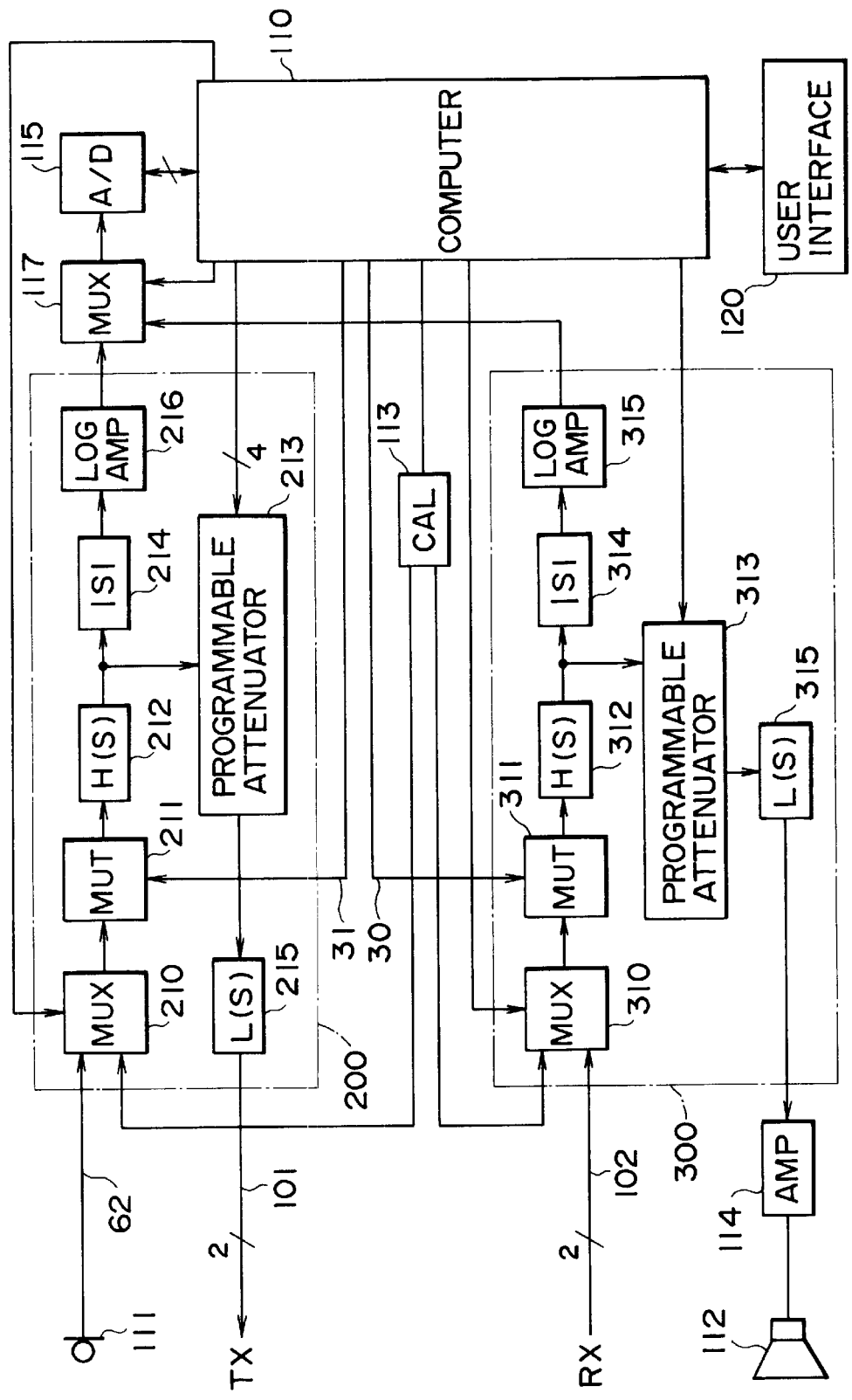
FIG. 7 is a block diagram of a conventional speakerphone of the voice switching system.
Figure 8:
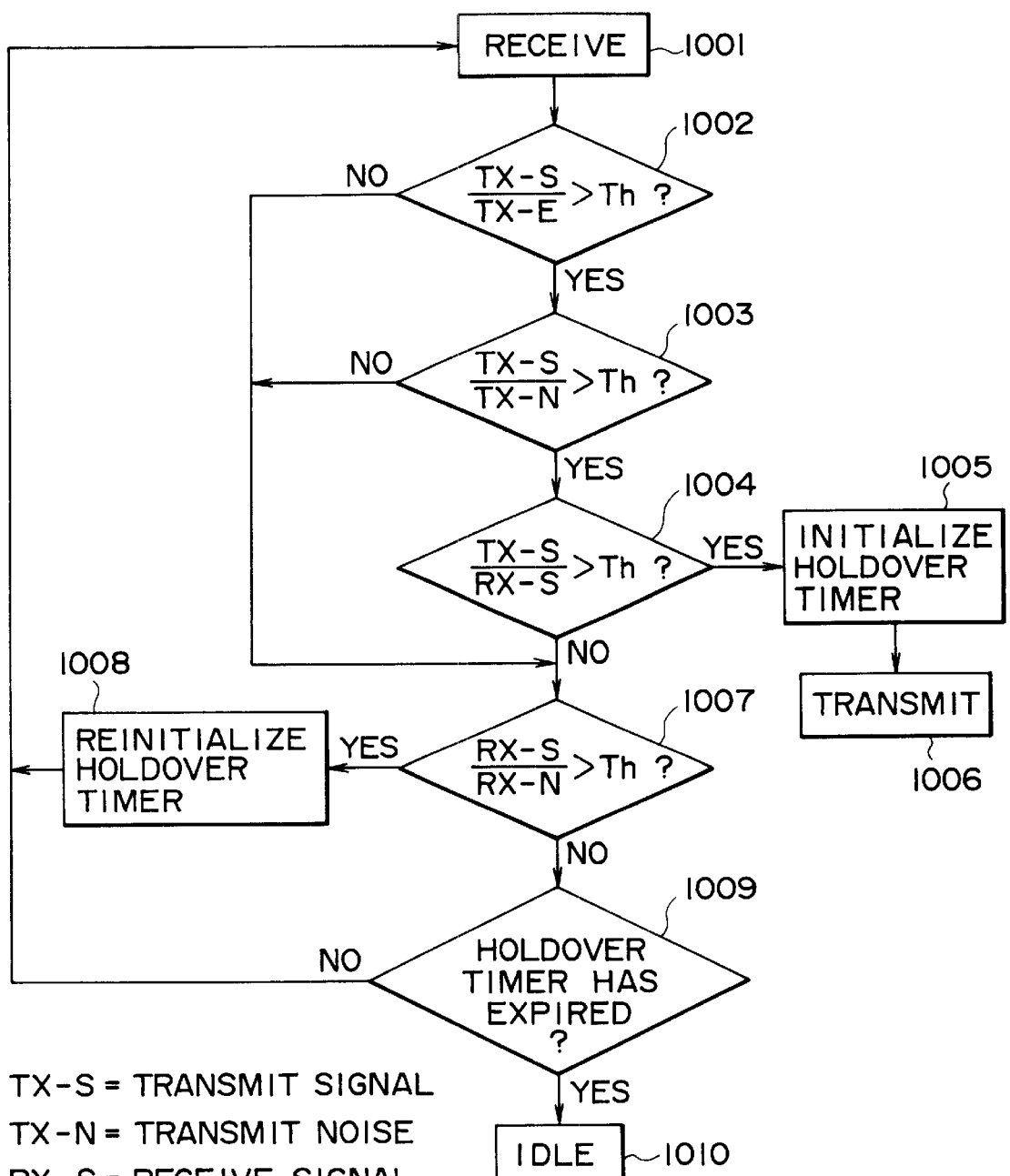
FIG. 8 is a flow chart for explaining the operation of the foregoing conventional speakerphone.
Figure 9:
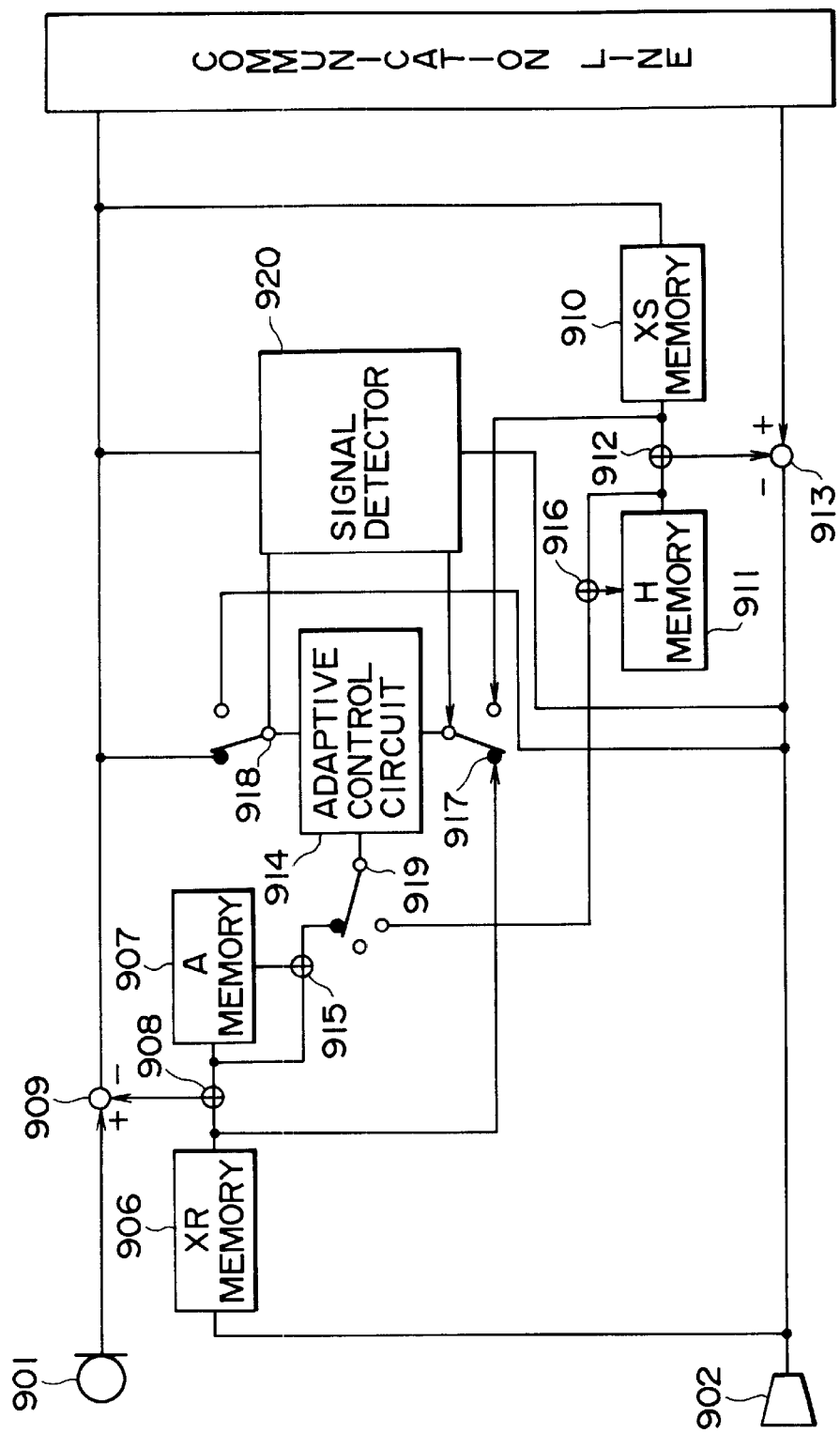
FIG. 9 is a block diagram of a speakerphone provided with the conventional echo canceler.

One embodiment of the present invention will hereafter be described in detail with reference to the accompanying drawings. The embodiment described hereunder represents only one example that materializes the invention, and does not confine the scope of the invention in a technological sense. Here, FIG. 1 illustrates a block diagram of a speakerphone relating to the one embodiment of the invention, FIG. 2 illustrates a flow chart for explaining the operation of the foregoing speakerphone, FIG. 3 graphs the variation of the characteristics of an echo canceler in time series, and FIG. 4 graphs in time series the state of adjusting the threshold by using the signal power.

As shown in FIG. 1, the speakerphone is classified into three sections: a voice switch section VS, an echo canceler section, and an echo threshold varying section.

The voice switch section VS includes: receive state setting means 2 for setting a receive state to attenuate a transmit signal TS inputted from a microphone 1 before transmitting the transmit signal TS to a general communication line SP connected, for example, to the two-wire/four-wire transducer; transmit state setting means 4 for setting a transmit state to attenuate a receive signal RS received from the line SP before outputting the receive signal RS to a speaker 3; a signal level detector 5 for detecting the signal level of the transmit signal TS and the receive signal RS; line echo transmit/receive determination means 6 which compares the receive signal RS with the transmit signal TS on the basis of a specific line echo threshold GRS set to the line echo generated by the transmit signal TS returning to a line receive side 21 from a line transmit side 20; acoustic echo transmit/receive determination means 7 which compares the transmit signal TS with the receive signal RS on the basis of a specific acoustic echo threshold GTS set to the acoustic echo generated by the receive signal RS returning to the microphone 1 from the speaker 3; speech signal detection means 8 for detecting a speech signal from the transmit signal TS and the receive signal RS; first transmit/receive state switching means 9 (equivalent to a state switching means) that sets, in the transmit preference mode, when the line echo transmit/receive determination means 6 determines that the transmit signal TS is greater or smaller than the receive signal RS, the transmit state or the receive state by means of the transmit state setting means 4 or the receive state setting means 2, maintains the transmit state or the receive state when the speech signal detection means 8 detects the speech signal from the transmit signal TS or the receive signal RS, and shifts the attenuation in the receive state setting means 2 and the transmit state setting means 4 into an intermediate attenuation when the speech signal detection means 8 detects noise signals; second transmit/receive state switching means 10 (equivalent to a state switching means) that sets, in the receive preference mode, when the acoustic echo transmit receive determination means 7 determines that the receive signal RS is greater or smaller than the transmit signal TS, the receive state or the transmit state by means of the receive state setting means 2 or the transmit state setting means 4, maintains the receive state or the transmit state when the speech signal detection means 8 detects the speech signal from the receive signal RS or the transmit signal TS, and shifts the attenuation in the receive state setting means 2 and the transmit state setting means 4 into an intermediate attenuation when the speech signal detection means 8 detects noise signals; process transfer means 11 transfers, when the first transmit/receive state switching means 9 sets the receive state or the intermediate state by the line echo transmit/receive determination means 6 determining the transmit signal TS to be smaller than the receive signal RS, the next process to the second transmit or the receive state switching means 10, and transfers, when the second transmit/receive state switching means 10 sets the transmit state or the intermediate state of the attenuation by the acoustic echo transmit/receive determination means 7 determining the receive signal RS to be smaller than the transmit signal TS, the next process to the first transmit/receive state switching means 9; and transmit/receive signal determination means 18 for determining the presence of the transmit signal TS or the receive signal RS after removing the influence by the system gain on the basis of the predetermined transmit path gain Gt and receive path gain Gr. The line echo threshold and the acoustic echo threshold can be varied by line echo threshold variation means 17 and acoustic echo threshold variation means 15, which will be described later.

The echo canceler section includes adaptive filters 12 (12a, 12b) for sequentially estimating the characteristics of the acoustic echo or the line echo by varying the response on the basis of the acoustic echo or the line echo when the speech signal detection means 8 detects the speech signal only in the receive signal RS or the transmit signal TS, and an acoustic echo canceler 13a and a line echo canceler 13b for subtracting a quasi-acoustic signal or a line echo signal obtained by inputting the receive signal RS or the transmit signal TS to the adaptive filter 12a or 12b from the transmit signal TS or the receive signal RS.

And, the speakerphone further comprises the echo threshold varying section in order to cooperate the echo canceler section with the voice switch section VS, which includes: residual acoustic echo estimation means 14 for estimating a residual acoustic echo signal remaining without being removed by the acoustic echo canceler 13a on the basis of the history of the receive signal RS outputted from the speaker; acoustic echo threshold variation means 15 for varying the acoustic echo threshold GTS of the acoustic echo transmit/receive determination means 7 in accordance with the residual acoustic echo signal estimated by the residual acoustic echo estimation means 14; residual line echo estimation means 16 for estimating a residual line echo signal remaining without being removed by the line echo canceler 13b on the basis of the history of the transmit signal TS outputted from the microphone to the line; line echo threshold variation means 17 for varying the line echo threshold GRS of the line echo transmit/receive determination means 6 in accordance with the residual line echo signal estimated by the residual line echo estimation means 16.

Here in the embodiment, the transmit state is defined as a state that the attenuation of the receive state setting means 2 is 0 and the attenuation of the transmit state setting means 4 is the maximum value, the transmit waiting state is defined as a state that the attenuation of the receive state setting means 2 is half of the maximum value and the attenuation of the transmit state setting means 4 is half of the maximum value, the receive state is defined as a state that the attenuation of the receive state setting means 2 is the maximum value and the attenuation of the transmit state setting means 4 is 0, and the receive waiting state is defined as a state that the attenuation of the receive state setting means 2 is half of the maximum value and the attenuation of the transmit state setting means 4 is half of the maximum value. Further, the combination of the transmit state and the transmit waiting state is referred to as the transmit preference state, and the combination of the receive state and the receive waiting state is referred to as the receive preference state.

In the foregoing speakerphone, the line echo threshold GRS and the acoustic echo threshold GTS that the line echo transmit receive determination means 6 and the acoustic echo transmit/receive determination means 7 each refer to are the estimated values of the line echo and the acoustic echo, which are preset, for example, within 0~48 dB on factory shipment. Gt and Gr in FIG. 1 indicate the transmit path gain and the receive path gain, respectively, that are used for the determination of the transmit/receive signal determination means 18, which are preset, for example, within 0~48 dB on factory shipment, in the same manner as the line echo threshold GRS and the acoustic echo threshold GTS. Further, Tt and Tr are the thresholds for determining the presence of the transmit speech signal and the receive speech signal, which are preset, for example, within 0~48 dB on factory shipment in consideration of the noise level contained in the transmit signal TS.

The switching operation of the transmit state and the receive state and the variation of the threshold in the foregoing speakerphone will now be described with reference to FIG. 2. Further, the transmit state, receive state, transmit waiting state, and receive waiting state are defined in the same manner as the above.

When the speakerphone is powered and connected to the general communication line, the speakerphone is usually set to the receive preference state. However here, the switching operation in the transmit preference state, namely, the operation of the first transmit/receive state switching means 9 will be described first.

At step S101, the state setting is confirmed in the first transmit/receive state switching means 9.

Next, the process moves to step S102 where the line echo transmit/receive determination means 6 compares the level of the transmit signal TS and the receive signal RS on the basis of the line echo threshold GRS to determine the state. If the transmit signal TS is grater than the receive signal RS from which the value of GRS is subtracted, the process advances to step S103, if the transmit signal TS is smaller than the receive signal RS, the process advances to step S104. Incidentally, the step S102 indicates that it continues the transmit preference process unless the voice signal level of a far-end talker clearly exceeds the line echo. Thus, the voice switch section VS continues the transmit preference process, even if a near-end talker speaks nothing for a while at the transmit preference state.

At step S103, the process sets again a flag for the transmit preference state, and the process advances to step 105 where the speech signal detection means 8 detects the speech signal of the transmit signal TS. Here, the speech signal detection means 8 detects the speech signal if the transmit signal is greater than the noise signal threshold, and detects the noise signal if it is smaller than the noise signal threshold.

At step S105, if the process determines that the transmit signal TS is a speech signal, the process advances to step S106 where it sets the receive state setting means 2 and the transmit state setting means 4 to the transmit state. Further, if the speech signal is detected only in the transmit signal TS by the decision at step S102 and step S105, the process advances to step S107 where the residual line echo estimation means 16 estimates the residual line echo signal remaining without being removed by the line echo canceler 13b.

Here, the performance of the adaptive filters 12 (12a, 12b) used in the echo canceler section can virtually be estimated by the characteristics of the input signal referred in the adaptive learning of the adaptive filters 12, which will be explained with reference to FIG. 3 and 4. FIG. 3 illustrates the state that the residual line echo signal decreases as the time progresses.

On the other hand, FIG. 4(a) illustrates the signal power of the input signal that the adaptive filters 12 referred on the adaptive learning, and FIG. 4(b) illustrates the integrated signal power of the transmit signal TS.

From FIGS. 3 and 4(b), it can be understood that the degree of the learning of the adaptive filters 12 increases as the integrated power of the input signal referred increases. This input signal is only needed to use, for example, the transmit signal when the speech signal is detected only in the transmit signal TS, which does not require special measuring means.

Accordingly, the residual line echo estimation means 16 applies an operation of which output decreases as the integrated power of the input signal (transmit signal TS in this case) increases. FIG. 4(c) illustrates the output of the operation against time. The actual value of the residual line echo shown in FIG. 3 and the estimated value of the residual line echo shown in FIG. 4(c) are consistent in tendency, and the estimated value of the residual line echo is enough to be used for varying the line echo threshold.

And, the process advances to step S108 where the line echo threshold variation means 17 varies the line echo threshold GRS as shown in FIG. 4(d), in correspondence with the residual line echo signal estimated by the residual line echo estimation means 16.

In this manner, based on the past input signal that the adaptive filters 12 referred during learning, the performance variation of the echo canceler can easily be estimated. Further, a special measurement means for carrying out the calibration is not needed for this estimation.

Further, if the process determines that the transmit signal TS is a noise signal at step S105, the process advances to step S109 where it sets the receive state setting means 2 and the transmit state setting means 4 to the intermediate states. After completing the processes at step S106 and step S109, the process returns to step S101 to continue the decision process.

On the other hand, if the process determines that the transmit signal TS is smaller than the receive signal RS from which the value of GRS is subtracted at step S102, the process moves to step S104 where the transmit/receive signal determination means 18 compares the transmit signal TS and the receive signal RS on the basis of the transmit path gain Gt and the receive path gain Gr. At this step S104, the possibility of the receive is examined with the system gain removed. At step S104, if the level of the transmit signal TS is determined greater than the receive signal RS, the process returns to step S103 where it sets the flag for the transmit preference state, and at the next step S105, it examines the presence of the transmit speech signal. And, if the level of the receive signal RS is determined greater than the transmit signal TS, the process progresses to step S110 where it sets the flag for the receive preference state, and at the next step S111, it examines the presence of the receive speech signal.

At step S111 the speech signal detection means 8 detects the speech signal of the receive signal RS. The determination of the speech signal detection means 8 is carried out, in the same manner as the transmit signal TS, on the basis that the receive signal RS is greater or smaller than the noise signal threshold.

At step S111, if the process determines that the receive signal RS is a speech signal, the process advances to step S112 where it sets the receive signal setting means 2 and the transmit signal setting means 4 to the receive state. Further, in the same manner as in the variation of the line echo threshold, the acoustic echo is estimated at step S113 and varied at step S114. And, if the process determines that the transmit signal TS is a noise signal at step S111, the process advances to step S115 where it sets the receive state setting means 2 and the transmit state setting means 4 to the intermediate states.

After completing the processes at step S112 and step S115, the process returns to step S101 to continue the decision process. When returning to step S101, the process at step S108 or S114 sets the line echo or the acoustic echo threshold to a low level to accompany with the performance improvement of the echo canceler. Accordingly, the speakerphone is able to perform a communication that approaches to the full duplex by the voice switch section VS.

If the decision process in the foregoing first transmit/receive state switching means 9 sets the flag for the receive preference, the process transfer means 11 transfers the decision process from the first transmit/receive state switching means 9 to the second transmit/receive state switching means 10. Here, the decision processes by the first transmit/receive state switching means 9 and the second transmit/receive state switching means 10 are in a pair relation, which are substantially equivalent.

If the state transfers from the transmit preference to the receive preference, for example, by a voice uttered by a far-end talker, first, the process moves to step S202 where the acoustic echo transmit/receive determination means 7 compares the receive signal RS with the transmit signal TS on the basis of the acoustic echo threshold GTS. If the receive signal RS is determined to be grater than the transmit signal TS from which the value of GTS is subtracted, the process advances to step S203, if the receive signal RS is determined to be smaller, the process advances to step S204. Incidentally, the step S202 indicates that it continues the receive preference process unless the voice signal level of a near-end talker clearly exceeds the acoustic echo. Thus, the speakerphone continues the receive preference process, even if a far-end talker speaks nothing for a while at the receive preference state.

At step S203, the process sets again a flag for the receive preference state. At this step S203, if the process continues, the second transmit/receive state switching means 10 is designed to perform the decision process.

Next, the process advances to step 205 where the speech signal detection means 8 determines whether the receive signal RS is a speech signal. And, at step S205, if the process determines that the receive signal RS is a speech signal, the process advances to step S206 where it sets the receive state setting means 2 and the transmit state setting means 4 to the receive state. And, in the same manner as the foregoing steps (S113, S114), the variation of the acoustic echo threshold is carried out through step S207 and Step 208. Further, if the process determines that the receive signal RS is a noise signal at step S205, the process advances to step S209 where it sets the receive state setting means 2 and the transmit state setting means 4 to the intermediate states.

After completing the state setting processes at step S206 and step S209, the process returns to step S101 to continue the process.

On the other hand, if the process determines that the receive signal RS is smaller than the transmit signal TS from which the value of GTS is subtracted at step S202, the process moves to step S204 where the transmit/receive signal determination means 18 compares the transmit signal TS and the receive signal RS on the basis of the transmit path gain Gt and the receive path gain Gr. At this step S204, the possibility of the transmit is examined with the system gain removed. At step S204, if the level of the receive signal RS is determined greater than the transmit signal TS, the process returns to step S203 where it sets the flag for the receive preference state, and at the next step S205, it examines the presence of the receive speech signal. And, if the level of the transmit signal TS is determined greater than the receive signal RS at step S204, the process progresses to step S210 where it switches from the flag for the receive preference state to the flag for the transmit preference state, and at the next step S211, it examines the presence of the transmit speech signal. Further, at step S210, the next decision process is designed to move to the first transmit/receive state switching means 9.

At step S211, the speech signal detection means 8 determines whether the transmit signal TS is a speech signal or a noise signal.

If the process determines that the transmit signal TS is a speech signal at step S211, the process advances to step S212 where it sets the receive signal setting means 2 and the transmit signal setting means 4 to the transmit state. Further, in the same manner as in the variation of the line echo threshold, the acoustic echo is estimated at step S213 and varied at step S214. And, if the process determines that the transmit signal TS is a noise signal at step S211, the process advances to step S215 where it sets the receive state setting means 2 and the transmit state setting means 4 to the intermediate states.

After completing the state setting processes at step S212 and step S215, the process returns to step S101 to continue the decision process. When returning to step S101, the process at step S208 or S214 sets the line echo threshold or the acoustic echo threshold to a low level to accompany with the performance improvement of the echo canceler. Accordingly, the speakerphone is able to perform a communication that approaches to the full duplex by the voice switch section VS.

In this manner, the foregoing speakerphone is able to estimate the performance variation of the echo canceler from the integrated power of the input signal that the adaptive filters 12 referred to during leaning. Accordingly, putting the echo canceler and the voice switch into cooperation, the speakerphone is able to achieve a full-duplex communication system, which improves in the transmit/receive switching performance and presents a better feeling during operation compared to the conventional speakerphone. Further, the performance variation of the foregoing echo canceler can be estimated by a simple arithmetic process, thereby achieving a speakerphone that is inexpensive and consumes a less power. Further, the threshold is varied in correspondence with the performance of the echo canceler that varies with time during communication, which makes unnecessary to use that unpleasant calibration tone.

The speakerphone relating to the foregoing embodiment integrates the speakerphone (corresponding to a first invention) that can vary the acoustic echo threshold with the speakerphone (corresponding to a second invention) that can vary the line echo threshold. However, when the acoustic echo is ignorable because the microphone 1 is located distant from the speaker 3, or when the line echo is ignorable because the communication line is made up with a short distance and two-way communication line directly connected, it is possible to form each of the speakerphone that can vary the acoustic echo threshold and the speakerphone that can vary the line echo threshold into a separate construction. In this case, the threshold is only needed to be varied as to either the acoustic echo or the line echo, which favors a further low cost. Such a speakerphone is included within the invention.

Further, in the foregoing embodiment, the performance variation of the adaptive filters 12 is estimated by using the integrated power of the past input signal. However, as shown in FIG. 5, the performance variation may be estimated on the basis of the integrated value of time at which the speech signal is detected. The estimation by the integrated value of time will further reduce the arithmetic processing volume. Such a speakerphone is also an example derived from the invention.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speakerphone comprising:
    receive state setting means for setting a receive state to attenuate a transmit signal inputted from a microphone before transmitting the transmit signal into a communication line;
    transmit state setting means for setting a transmit state to attenuate a receive signal received from the communication line before outputting the receive signal from a speaker;
    state switching means for determining a state and setting the determined state, said state switching means comprising means for comparing the difference between the transmit signal and the receive signal with an acoustic echo threshold set to an acoustic echo generated by the receive signal returning to the microphone from the speaker;
    speech signal detection means for detecting a speech signal from the transmit signal and the receive signal;
    acoustic echo canceling means, including an adaptive filter for sequentially estimating the characteristics of the acoustic echo by varying the response on the basis of the acoustic echo when said speech signal detection means detects the speech signal only in the receive signal, for subtracting a quasi-acoustic echo signal obtained by inputting the receive signal to the adaptive filer from the transmit signal;
    residual acoustic echo estimation means for estimating a residual acoustic echo signal remaining without being removed by said acoustic echo canceling means on the basis of the history of the receive signal outputted in the past from the speaker; and acoustic echo threshold variation means for varying the acoustic echo threshold of said state switching means in accordance with the residual acoustic echo signal estimated by said residual acoustic echo estimation means.

2. A speakerphone as claimed in claim 1, wherein said residual acoustic echo estimation means estimates the residual acoustic echo signal on the basis of the integrated value of a power of the receive signal obtained by integrating the power of the receive signal when said speech signal detection means detects the speech signal only in the receive signal.

3. A speakerphone as claimed in claim 1, wherein said residual acoustic echo estimation means estimates the residual acoustic echo signal on the basis of the integrated value of a detected time of the receive signal obtained by integrating the detected time of the receive signal when said speech signal detection means detects the speech signal only in the receive signal.

4. A speakerphone as claimed in claim 1, wherein said state switching means maintains the receive state or the transmit state when said speech signal detection means detects the speech signal from the receive signal or the transmit signal, and shifts an attenuation in said receive state setting means and the transmit state setting means into an intermediate attenuation when said speech signal detection means does not detect the speech signal.

5. A speakerphone comprising:

receive state setting means for setting a receive state to attenuate a transmit signal inputted from a microphone before transmitting the transmit signal into a communication line;

transmit state setting means for setting a transmit state to attenuate a receive signal received from the communication line before outputting the receive signal from a speaker;

state switching means for determining a state and setting the determined state, said state switching means comprising means for comparing the difference between the transmit signal and the receive signal with a line echo threshold set to a line echo generated by the transmit signal returning to a line receive side from a line transmit side;

speech signal detection means for detecting a speech signal from the transmit signal and the receive signal;

line echo canceling means, including an adaptive filter for sequentially estimating the characteristics of the line echo by varying the response on the basis of the line echo when said speech signal detection means detects the speech signal only in the transmit signal, for subtracting a quasi-line echo signal obtained by inputting the transmit signal to the adaptive filter from the receive signal;

residual line echo estimation means for estimating a residual line echo signal remaining without being removed by said line echo canceling means on the basis of the history of the transmit signal outputted in the past from the microphone to the communication line; and line echo threshold variation means for varying the line echo threshold of said state switching means in accordance with the residual line echo signal estimated by said residual line echo estimation means.

6. A speakerphone as claimed in claim 5, wherein said residual line echo estimation means estimates the residual line echo signal on the basis of the integrated value of a power of the transmit signal obtained by integrating the power of the transmit signal when said speech signal detection means detects the speech signal only in the transmit signal.

7. A speakerphone as claimed in claim 5, wherein said residual line echo estimation means estimates the residual line echo signal on the basis of the integrated value of a detected time of the transmit signal obtained by integrating the detected time of the transmit signal when said speech signal detection means detects the speech signal only in the transmit signal.

8. A speakerphone as claimed in claim 5, wherein said state switching means maintains the receive state or the transmit state when said speech signal detection means detects the speech signal from the receive signal or the transmit signal, and shifts an attenuation in said receive state setting means and the transmit state setting means into an intermediate attenuation when said speech signal detection means does not detect the speech signal.

9. A speakerphone comprising:

receive state setting means for setting a receive state to attenuate a transmit signal inputted from a microphone before transmitting the transmit signal into a communication line;

transmit state setting means for setting a transmit state to attenuate a receive signal received from the communication line before outputting the receive signal from a speaker;

state switching means for determining a state and setting the determined state, said state switching means comprising means for comparing the difference between the transmit signal and the receive signal with an acoustic echo threshold set to an acoustic echo generated by the receive signal returning to the microphone from the speaker and means for comparing the difference between the transmit signal and the receive signal with a line echo threshold set to a line echo generated by the transmit signal returning to a line receive side from a line transmit side;

speech signal detection means for detecting a speech signal from the transmit signal and the receive signal;

acoustic echo canceling means, including an adaptive filter for sequentially estimating the characteristics of the acoustic echo by varying the response on the basis of the acoustic echo when said speech signal detection means detects the speech signal only in the receive signal, for subtracting a quasi-acoustic echo signal obtained by inputting the receive signal to the adaptive filter from the transmit signal;

residual acoustic echo estimation means for estimating a residual acoustic echo signal remaining without being removed by said acoustic echo canceling means on the basis of the history of the receive signal outputted in the past from the speaker; and acoustic echo threshold variation means for varying the acoustic echo threshold of said state switching means in accordance with the residual acoustic echo signal estimated by said residual acoustic echo estimation means;

line echo canceling means, including an adaptive filter for sequentially estimating the characteristics of the line echo by varying the response on the basis of the line echo when said speech signal detection means detects the speech signal only in the transmit signal, for subtracting a quasi-line echo signal obtained by inputting the transmit signal to the adaptive filter from the receive signal;

residual line echo estimation means for estimating a residual line echo signal remaining without being removed by said line echo canceling means on the basis of the history of the transmit signal outputted in the past from the microphone to the communication line; and line echo threshold variation means for varying the line echo threshold of said state switching means in accordance with the residual line echo signal estimated by said residual line echo estimation means.

10. A speakerphone as claimed in claim 9, wherein:

said residual acoustic echo estimation means estimates the residual acoustic echo signal on the basis of the integrated value of a power of the receive signal obtained by integrating the power of the receive signal when said speech signal detection means detects the speech signal only in the receive signal; and said residual line echo estimation means estimates the residual line echo signal on the basis of the integrated value of a power of the transmit signal obtained by integrating the power of the transmit signal when said speech signal detection means detects the speech signal only in the transmit signal.

11. A speakerphone as claimed in claim 9, wherein:

said residual acoustic echo estimation means estimates the residual acoustic echo signal on the basis of the integrated value of a detected time of the receive signal obtained by integrating the detected time of the receive signal when said speech signal detection means detects the speech signal only in the receive signal; and said residual line echo estimation means estimates the residual line echo signal on the basis of the integrated value of a detected time of the transmit signal obtained by integrating the detected time of the transmit signal when said speech signal detection means detects the speech signal only in the transmit signal.

12. A speakerphone as claimed in claim 9, wherein said state switching means maintains the receive state or the transmit state when said speech signal detection means detects the speech signal from the receive signal or the transmit signal, and shifts an attenuation in said receive state setting means and the transmit state setting means into an intermediate attenuation when said speech signal detection means does not detect the speech signal.

* * * * *